United States Patent
Chen et al.

(10) Patent No.: US 11,856,522 B2
(45) Date of Patent: Dec. 26, 2023

(54) METHOD AND DEVICE FOR UPLINK POWER CONTROL, AND STORAGE MEDIUM

(71) Applicant: GUANGDONG OPPO MOBILE TELECOMMUNICATIONS CORP., LTD., Guangdong (CN)

(72) Inventors: Wenhong Chen, Dongguan (CN); Yun Fang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 18/340,576

(22) Filed: Jun. 23, 2023

(65) Prior Publication Data

US 2023/0337141 A1   Oct. 19, 2023

Related U.S. Application Data

(63) Continuation of application No. PCT/CN2020/140946, filed on Dec. 29, 2020.

(51) Int. Cl.
*H04W 52/10* (2009.01)

(52) U.S. Cl.
CPC ................... *H04W 52/10* (2013.01)

(58) Field of Classification Search
CPC ..................................................... H04W 52/10
See application file for complete search history.

(56) References Cited

U.S. PATENT DOCUMENTS

| | | | |
|---|---|---|---|
| 9,554,339 B2* | 1/2017 | Lee | H04W 52/58 |
| 9,788,280 B2* | 10/2017 | Lee | H04W 52/146 |
| 10,588,095 B2* | 3/2020 | He | H04L 5/0053 |
| 10,911,083 B2* | 2/2021 | Nguyen | H04B 17/318 |

(Continued)

FOREIGN PATENT DOCUMENTS

| | | |
|---|---|---|
| CN | 109151973 | 1/2019 |
| CN | 110536399 | 12/2019 |

(Continued)

OTHER PUBLICATIONS

3GPP TSG-RAN WG1 Meeting #99 R1-1913123, Reno, USA, Nov. 18-22, 2019, Title: Correction on resetting accumulation of closed-loop power control, Source to WG: Huawei, HiSilicon, Source to TSG: R1, Work item code: NR_newRAT-Core, Release: Rel-15.

(Continued)

*Primary Examiner* — Hai V Nguyen
(74) *Attorney, Agent, or Firm* — PERKINS COIE LLP

(57) ABSTRACT

A method for uplink power control, including: determining a plurality of sets of open-loop power control parameters, each set of open-loop power control parameters including one or more open-loop power control parameters, and the plurality of sets of open-loop power control parameters being respectively used for different retransmissions of a same uplink signal; and in a case target open-loop power control parameters are reconfigured, setting a target power control adjustment state associated with a power control adjustment state index corresponding to the target open-loop power control parameters to zero, where the target open-loop power control parameters are any set of the plurality of sets of open-loop power control parameters.

20 Claims, 5 Drawing Sheets

(56) References Cited

U.S. PATENT DOCUMENTS

| | | | |
|---|---|---|---|
| 10,939,383 B2* | 3/2021 | Chen | H04W 52/08 |
| 10,992,366 B2* | 4/2021 | Jung | H04W 52/36 |
| 11,240,761 B2* | 2/2022 | Gong | H04W 52/146 |
| 11,310,746 B2* | 4/2022 | Nory | H04W 72/23 |
| 11,540,236 B2* | 12/2022 | Ibrahim | H04W 52/54 |
| 11,659,493 B2* | 5/2023 | Kung | H04W 52/146 370/318 |
| 11,696,235 B2* | 7/2023 | Sun | H04W 72/23 455/450 |
| 11,729,723 B2* | 8/2023 | Yang | H04W 52/26 370/329 |
| 2016/0242125 A1* | 8/2016 | Lee | H04W 52/246 |
| 2017/0094610 A1* | 3/2017 | Lee | H04W 52/146 |
| 2019/0021127 A1* | 1/2019 | Tang | H04W 36/36 |
| 2019/0313348 A1* | 10/2019 | MolavianJazi | H04W 52/50 |
| 2019/0364511 A1* | 11/2019 | Chen | H04L 27/0014 |
| 2020/0100194 A1* | 3/2020 | Nangia | H04W 72/0453 |
| 2020/0119799 A1* | 4/2020 | Jung | H04W 52/36 |
| 2020/0266867 A1* | 8/2020 | Park | H04B 7/0456 |
| 2020/0288404 A1* | 9/2020 | Nory | H04W 52/08 |
| 2020/0305183 A1* | 9/2020 | Papasakellariou | H04W 72/23 |
| 2020/0367174 A1* | 11/2020 | MolavianJazi | H04W 52/367 |
| 2021/0068058 A1* | 3/2021 | Sun | H04W 52/12 |
| 2021/0211180 A1* | 7/2021 | Jung | H04W 72/23 |
| 2021/0211986 A1* | 7/2021 | MolavianJazi | H04W 52/08 |
| 2021/0410077 A1* | 12/2021 | Guo | H04W 52/325 |
| 2021/0410079 A1* | 12/2021 | MolavianJazi | H04W 52/44 |
| 2022/0200767 A1* | 6/2022 | Park | H04B 7/0478 |
| 2022/0201619 A1* | 6/2022 | Yao | H04W 52/242 |
| 2022/0217644 A1* | 7/2022 | Kung | H04W 52/365 |
| 2022/0217653 A1* | 7/2022 | Kung | H04L 5/0048 |
| 2022/0225247 A1* | 7/2022 | Huang | H04W 52/34 |
| 2022/0330167 A1* | 10/2022 | Chen | H04W 72/23 |
| 2022/0369235 A1* | 11/2022 | Chen | H04W 52/146 |
| 2022/0394499 A1* | 12/2022 | Matsumura | H04W 72/04 |
| 2022/0417964 A1* | 12/2022 | Matsumura | H04W 72/542 |
| 2023/0058165 A1* | 2/2023 | MolavianJazi | H04W 52/281 |
| 2023/0067551 A1* | 3/2023 | Wu | H04W 72/0453 |
| 2023/0078181 A1* | 3/2023 | Ghanbarinejad | H04W 52/383 |
| 2023/0080162 A1* | 3/2023 | Ghanbarinejad | H04W 52/16 |
| 2023/0080392 A1* | 3/2023 | Chen | H04W 72/23 370/329 |
| 2023/0087394 A1* | 3/2023 | Yuan | H04L 5/0023 370/329 |
| 2023/0239096 A1* | 7/2023 | Go | H04L 5/0098 370/329 |

FOREIGN PATENT DOCUMENTS

| | | |
|---|---|---|
| CN | 111010728 A | 4/2020 |
| CN | 111615182 | 9/2020 |
| CN | 111656842 | 9/2020 |
| CN | 111800240 | 10/2020 |
| WO | 2019070178 A1 | 4/2019 |

OTHER PUBLICATIONS

International Search Report in the international application No. PCT/CN2020/140946, dated Jul. 13, 2021.

Written Opinion of the International Search Authority in the international application No. PCT/CN2020/140946, dated Jul. 13, 2021.

3GPP TS 38.213 V16.3.0 (Sep. 2020), 3rd Generation Partnership Project; Technical Specification Group Radio Access Network; NR; Physical layer procedures for control, (Release 16).

3GPP TSG RAN WG1 #103-e R1-2008218, e-Meeting, Oct. 26-Nov. 13, 2020, Source: OPPO, Title: Enhancements on multi-TRP for PDCCH, PUCCH and PUSCH, Agenda Item: 8.1.2.1, Document for: Discussion and Decision.

3GPP TSG-RAN WG1 Meeting #103-e R1-2009251, e-Meeting, Oct. 26-Nov. 13, 2020, Agenda item: 8.1.2.1, Source: Qualcomm Incorporated, Title: Enhancements on Multi-TRP for PDCCH, PUCCH and PUSCH, Document for: Discussion/Decision.

3GPP TSG RAN WG1 #100-e R1-2000913, e-Meeting, Feb. 24-Mar. 6, 2020, Source: NTT Docomo, Inc., Title: Configured grant enhancement for NR-U, Agenda Item: 7.2.2.2.4, Document for: Discussion and Decision.

* cited by examiner

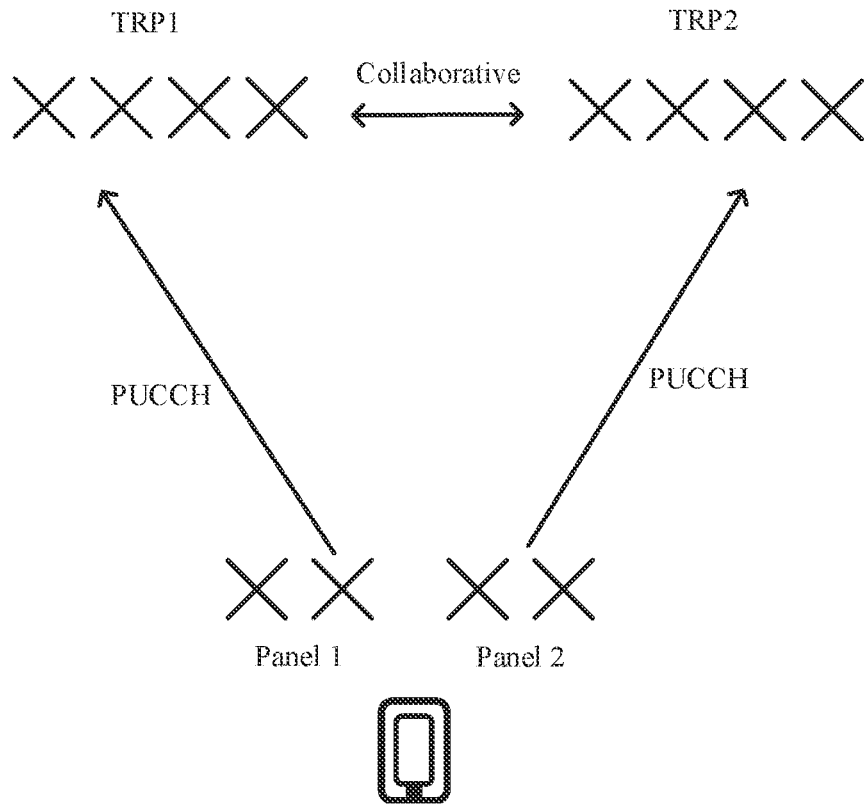

FIG. 6

| Multiple sets of open-loop power control parameters are determined, each set of open-loop power control parameters includes one or more open-loop power control parameters, and the multiple sets of open-loop power control parameters are respectively used for different retransmissions of a same uplink signal | 710 |

| In a case target open-loop power control parameters are reconfigured, a target power control adjustment state associated with a power control adjustment state index corresponding to the target open-loop power control parameters is set to zero. The target open-loop power control parameters are any set of the multiple sets of open-loop power control parameters | 720 |

FIG. 7

```
┌─────────────────────────────────────────────────────────────┐
│ Multiple sets of open-loop power control parameters are     │
│ determined, each set of open-loop power control parameters  │
│ includes one or more open-loop power control parameters,    │
│ and the multiple sets of open-loop power control            │──810
│ parameters are respectively used for different              │
│ retransmissions of a same PUSCH. Each set of open-loop      │
│ power control parameters includes at least one of a target  │
│ power or a path loss factor                                 │
└─────────────────────────────────────────────────────────────┘
                             │
                             ▼
┌─────────────────────────────────────────────────────────────┐
│ In a case target open-loop power control parameters are     │
│ reconfigured, a target power control adjustment state       │
│ associated with a power control adjustment state index      │──820
│ corresponding to the target open-loop power control         │
│ parameters is set to zero. The target open-loop power       │
│ control parameters are any set of the multiple sets of      │
│ open-loop power control parameters                          │
└─────────────────────────────────────────────────────────────┘
```

FIG. 8

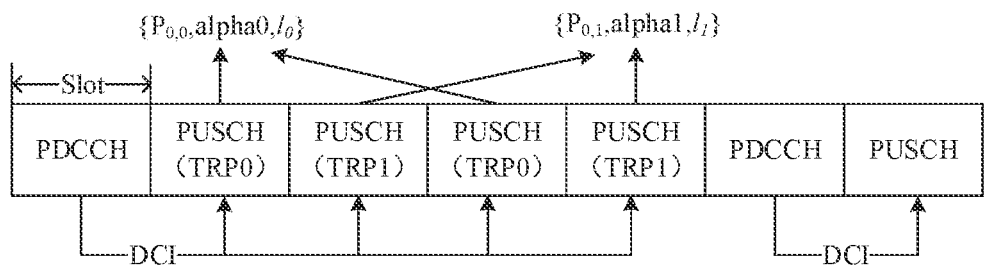

FIG. 9

```
┌─────────────────────────────────────────────────────────────┐
│ Multiple sets of open-loop power control parameters are     │
│ determined, each set of open-loop power control parameters  │
│ includes one or more open-loop power control parameters,    │──1010
│ and the multiple sets of open-loop power control            │
│ parameters are respectively used for different              │
│ retransmissions of a same PUCCH. Each set of open-loop      │
│ power control parameters includes a target power            │
└─────────────────────────────────────────────────────────────┘
                             │
                             ▼
┌─────────────────────────────────────────────────────────────┐
│ In a case target open-loop power control parameters are     │
│ reconfigured, a target power control adjustment state       │──1020
│ associated with a power control adjustment state index      │
│ corresponding to the target open-loop power control         │
│ parameters is set to zero. The target open-loop power       │
│ control parameters are any set of the multiple sets of      │
│ open-loop power control parameters                          │
└─────────────────────────────────────────────────────────────┘
```

FIG. 10

METHOD AND DEVICE FOR UPLINK POWER CONTROL, AND STORAGE MEDIUM

CROSS REFERENCE TO RELATED APPLICATION

This is a continuation of International Application No. PCT/CN2020/140946 filed on Dec. 29, 2020, the disclosure of which is hereby incorporated by reference in its entirety.

BACKGROUND

In order to perform more accurate uplink power control in a Frequency Range 1 (FR1), independent power control parameters can be used for retransmissions to different Transmission/Reception Points (TRPs), so that a transmitting power matches with a channel of a corresponding TRP better.

At this time, when a certain open-loop power control parameter is reconfigured, how to reset a power control adjustment state while ensuring independent closed-loop power control for two TRPs is a problem that needs to be solved.

SUMMARY

Embodiments of the present disclosure relate to the field of communication technologies, and particularly to a method and device for uplink power control, and a storage medium.

The technical solutions are described as follows.

A first aspect of the embodiments of the present disclosure provides a method for uplink power control, which is applied to a terminal device and includes the following operations.

Multiple sets of open-loop power control parameters are determined, each set of open-loop power control parameters includes one or more open-loop power control parameters, and the multiple sets of open-loop power control parameters are respectively used for different retransmissions of a same uplink signal.

In a case target open-loop power control parameters are reconfigured, a target power control adjustment state associated with a power control adjustment state index corresponding to the target open-loop power control parameters is set to zero.

The target open-loop power control parameters are any set of the multiple sets of open-loop power control parameters.

A second aspect of the embodiments of the present disclosure provides a device for uplink power control, which includes a processor, a transceiver, and a memory configured to store a computer program executable by the processor, and the processor is configured to perform the following operations.

Multiple sets of open-loop power control parameters are determined, each set of open-loop power control parameters includes one or more open-loop power control parameters, and the multiple sets of open-loop power control parameters are respectively used for different retransmissions of a same uplink signal.

In a case target open-loop power control parameters are reconfigured, a target power control adjustment state associated with a power control adjustment state index corresponding to the target open-loop power control parameters is set to zero.

The target open-loop power control parameters are any set of the multiple sets of open-loop power control parameters.

A third aspect of the embodiments of the present disclosure provides a non-transitory computer-readable storage medium having stored thereon a computer program that, when executed by a processor of a terminal device, causes the processor to perform the following operations.

Multiple sets of open-loop power control parameters are determined, each set of open-loop power control parameters includes one or more open-loop power control parameters, and the multiple sets of open-loop power control parameters are respectively used for different retransmissions of a same uplink signal.

In a case target open-loop power control parameters are reconfigured, a target power control adjustment state associated with a power control adjustment state index corresponding to the target open-loop power control parameters is set to zero.

The target open-loop power control parameters are any set of the multiple sets of open-loop power control parameters.

BRIEF DESCRIPTION OF THE DRAWINGS

FIG. 6 exemplarily illustrates a schematic diagram of a PUCCH retransmission based on multiple TRPs/Panels.

FIG. 7 is a flowchart of a method for uplink power control according to an embodiment of the present disclosure.

FIG. 8 is a flowchart of a method for uplink power control according to another embodiment of the present disclosure.

FIG. 9 illustrates a schematic diagram of power control for a PUSCH retransmission based on multiple TRPs.

FIG. 10 is a flowchart of a method for uplink power control according to another embodiment of the present disclosure.

DETAILED DESCRIPTION

In order to make the objects, technical solutions and advantages of the present disclosure clearer, the embodiments of the present disclosure will be described below in more detail with reference to the accompanying drawings.

The network architecture and the service scenarios described in the embodiments of the present disclosure are intended to more clearly explain the technical solutions of the embodiments of the present disclosure, and do not constitute a limitation to the technical solutions provided by the embodiments of the present disclosure. Those skilled in the art may know that the technical solution provided in the embodiments of the present disclosure is equally applicable to similar technical problems with the evolution of the network architecture and the emergence of new service scenarios.

Figure 1:
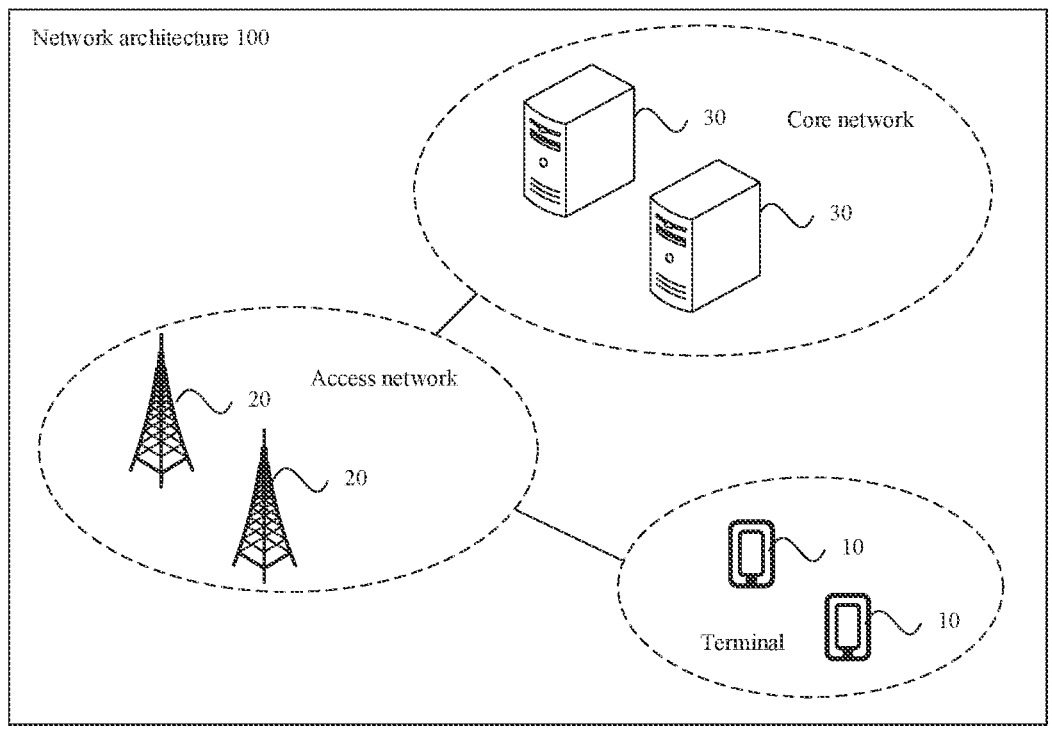
FIG. 1 is a schematic diagram of network architecture according to an embodiment of the present disclosure.

Referring to FIG. 1, which illustrates a schematic diagram of network architecture according to an embodiment of the present disclosure. The network architecture 100 may include a terminal device 10, an access network device 20 and a core network device 30.

The terminal device 10 may be referred to as User Equipment (UE), an access terminal, a subscriber unit, a subscriber station, a mobile station, a mobile platform, a remote station, a remote terminal, a mobile device, a wireless communication device, a user agent, or a user device. Optionally, the terminal device 10 may also be a cellular phone, a cordless phone, a Session Initiation Protocol (SIP) phone, a Wireless Local Loop (WLL) station, a Personal Digital Assistant (PDA), a handheld device with a wireless communication function, a computing device or other processing device connected to a wireless modem, a vehicle-mounted device, a wearable device, a terminal device in 5th Generation System (5GS) or a terminal device in a future evolved Public Land Mobile Network (PLMN) or the like. The embodiments of the present disclosure are not limited in this regard. For convenience of description, the devices mentioned above are collectively referred to as terminal devices. The number of terminal devices 10 is typically multiple, and one or more terminal devices 10 may be distributed within a cell managed by each access network device 20.

The access network device 20 is a device deployed in an access network to provide a wireless communication function for the terminal device 10. The access network device 20 may include various forms of macro base stations, micro base stations, relay stations, access points and the like. In systems with different wireless access technologies, the names of devices having access network device functions may be different, for example, in 5G New Radio (NR) systems, they are called as gNodeB or gNB. With the evolution of communication technologies, the name "access network device" may be changed. For convenience of description, in the embodiments of the present disclosure, the devices mentioned above providing wireless communication functions for the terminal device 10 are collectively referred to as access network devices. Optionally, a communication relationship may be established between the terminal device 10 and the core network device 30 through the access network device 20. As an example, in a Long Term Evolution (LTE) system, the access network device 20 may be an Evolved Universal Terrestrial Radio Access Network (EUTRAN) or one or more eNodeB in the EUTRAN. In a 5G NR system, the access network device 20 may be a Radio Access Network (RAN) or one or more gNBs in the RAN. In the embodiments of the present disclosure, unless otherwise specified, the network device refers to the access network device 20.

The core network device 30 is mainly to provide functions of user connections, management for users and completion of bearing for services, and serves as an interface to an external network provided by a bearer network. For example, a core network device in the 5G NR system may include devices such as an Access and Mobility Management Function (AMF) entity, a User Plane Function (UPF) entity and a Session Management Function (SMF) entity.

In one example, access network device 20 and core network device 30 communicate with each other via a certain air interface technique, such as, an NG interface in the 5G NR system. The access network device 20 and the terminal device 10 communicate with each other via a certain air interface technique, such as, a Uu interface.

The "5G NR system" in the embodiments of the present disclosure may also be referred to as a 5G system or an NR system, but those skilled in the art will understand the meaning thereof. The technical solutions described in the embodiments of the disclosure may be applied to the 5G NR system, and may also be applied to the subsequent evolution systems of the 5G NR system.

Hereinafter, some related art involved in the present disclosure will be introduced and explained first.

1. Uplink Retransmission

Figure 2:
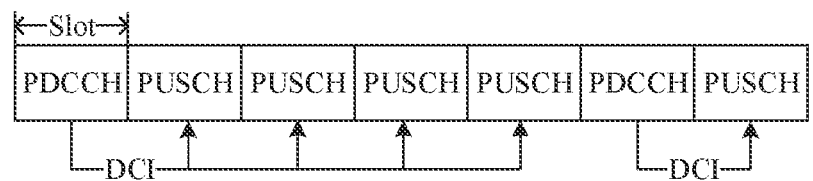
FIG. 2 exemplarily illustrates a schematic diagram of a PUSCH retransmission based on slots.
Figure 3:
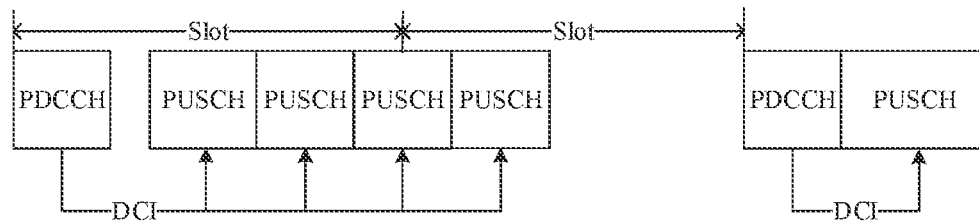
FIG. 3 exemplarily illustrates a schematic diagram of a PUSCH retransmission based on Orthogonal Frequency Division Multiplexing (OFDM) symbols.
Figures 4, 5:
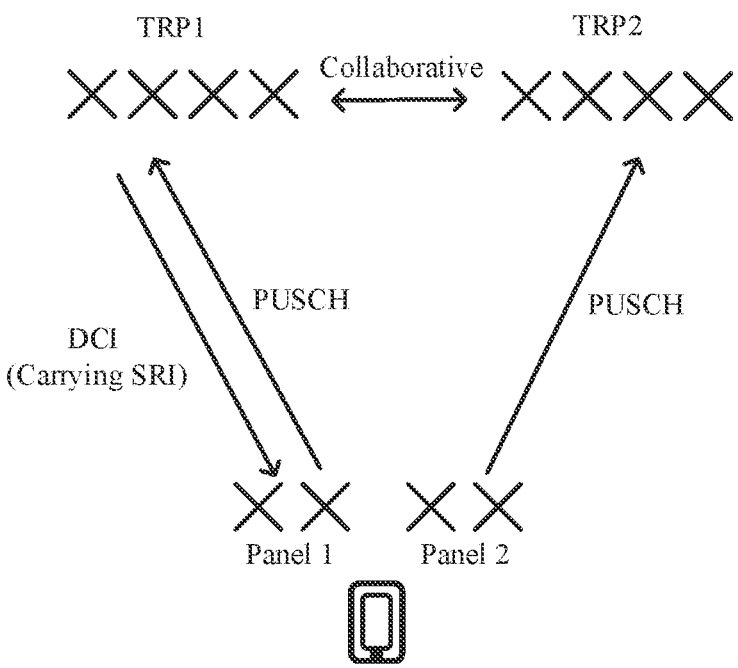
FIG. 4 exemplarily illustrates a schematic diagram of a PUSCH retransmission based on multiple TRPs/Panels.
FIG. 5 exemplarily illustrates a schematic diagram of a PUCCH retransmission based on slots.

In order to improve the transmission reliability of a Physical Uplink Shared Channel (PUSCH), NR introduces a PUCCH retransmission, that is, PUSCHs carrying same data are transmitted multiple times through different time-frequency resources, antennas, redundancy versions and the like, so as to obtain the diversity gain and reduce the error detection rate (i.e. Block Error Rate (BLER)). Specifically, the above retransmission may be performed on different slots (as illustrated in FIG. 2), on different Orthogonal Frequency Division Multiplexing (OFDM) symbols (as illustrated in FIG. 3, within or across slots), or on multiple panels (as illustrated in FIG. 4). For the multi-slots or multi-symbols retransmission, a piece of Downlink Control Information (DCI) may schedule multiple PUSCHs to transmit on multiple consecutive slots or multiple OFDM symbols, which carry the same data but using different redundancy versions. In this way, receiving ends of different retransmissions may be the same TRP or different TRPs. For the multiple-panels retransmission, the PUSCHs carrying the same data are transmitted respectively on different Panels at the same time, and receiving ends may be the same TRP or different TRPs. In the PUSCH retransmission, different retransmissions may use different beams, different precoding matrices, different redundancy versions, different power control parameters and different frequency domain resources.

Similar to the PUSCH, a Physical Uplink Control Channel (PUCCH) may also support a retransmission, that is, PUCCHs carrying same uplink control information may be transmitted many times through different resources or antennas, so as to obtain the diversity gain and reduce the BLER. Specifically, the above retransmissions may be performed on multiple slots (as illustrated in FIG. 5) or on multiple panels (as illustrated in FIG. 6). For the multi-slots retransmission, the network device configures a respective number of repetitions N (nrofSlots) corresponding to each PUCCH format through Radio Resource Control (RRC) signaling. After receiving the signaling, the terminal uses the same physical resources to transmit the same uplink control information in N consecutive slots. Since PUCCHs in different slots are transmitted to different TRPs, transmission beams and power control parameters (such as, path loss measurement reference signals) used can also be configured independently. For example, one PUCCH resource may be indicated with N pieces of spatial relation information PUCCH-spatialrelationinfo or N Transmission Configuration Indicator (TCI) states for PUCCH retransmissions in different slots, and the transmission beam and power control parameter for the PUCCH may be obtained from the above N pieces of spatial relation information PUCCH-spatialrelationinfo or N TCI states. Where N is the number of collaborative TRPs or Panels, as illustrated in FIG. 6, for a case of two TRPs, N=2.

2. Uplink PUSCH Power Control

At present, a transmitting power of the PUSCH may be calculated by the following formula:

$$P_{PUSCH,b,f,c}(i, j, q_d, l) =$$

$$\min\begin{Bmatrix} P_{CMAX,f,c}(i) \\ P_{O\_PUSCH,b,f,c}(j) + 10\log_{10}\left(2^{\mu} \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{Bmatrix}$$

Where $P_{CMAX,f,c}(i)$ is a maximum transmitting power on a current carrier of the terminal, i is an index of one PUSCH transmission, j is an open-loop power control index (including a target power $P_{O\_PUSCH,b,f,c}(j)$ and a path loss factor $\alpha_{b,f,c}(j)$); $q_d$ is an index of a reference signal used for path loss measurement, which is used to obtain a path loss value $PL_{b,f,c}(q_d)$ and is also an open-loop power control parameter; and $f_{b,f,c}(i,l)$ is a power control adjustment state in which l is an index of the power control adjustment state. The terminal determines a closed-loop power adjustment factor according to a Transmit Power Control (TPC) command field from a network side, and the TPC command field may be carried by DCI used for scheduling the PUSCH in an UE search space or by a DCI format 2_2 used for carrying a group TPC command field in a common search space. The power control adjustment states corresponding to different power control adjustment state indexes are calculated independently, so that different PUSCH transmitting powers may be obtained.

In the NR, the terminal determines transmission beams for a scheduled PUSCH based on a Sounding Reference Signal (SRS) Resource Indicator (SRI) in DCI, and also determines power control parameters used by the PUSCH based on the SRI. Specifically, the network side configures multiple SRI-PUSCH-PowerControl parameter fields through RRC signaling in advance, each parameter field corresponds to a respective SRI value, and the parameter field includes a set of PUSCH power control parameter configurations (such as, j, $q_d$, l) corresponding to the SRI value. In a case values indicated by the SRI are different, the power control parameter configurations in the corresponding parameter field (SRI-PUSCH-PowerControl) are used to determine a transmitting power of the currently scheduled PUSCH. In a case open-loop power control parameters corresponding to open-loop power control index included in one SRI-PUSCH-PowerControl are reconfigured, the terminal needs to reset the power control adjustment state corresponding to the power control adjustment state index included in the SRI-PUSCH-PowerControl (i.e., setting an accumulated value to zero), and the power control adjustment states corresponding to other power control adjustment state indexes are not affected. Responsive to that the SRI-PUSCH-PowerControl parameter field does not be configured by high-layer signaling, the terminal will reset the power control adjustment state corresponding to l=0 (i.e., setting the accumulated value to zero) as long as the target power $P_{O\_PUSCH,b,f,c}(j)$ is reconfigured.

3. Uplink PUCCH Power Control

At present, a transmitting power of the PUCCH may be calculated by the following formula:

$$P_{PUSCH,b,f,c}(i, q_u, q_d, l) =$$

$$\min\begin{Bmatrix} P_{CMAX,f,c}(i) \\ P_{O\_PUSCH,b,f,c}(q_u) + 10\log_{10}\left(2^{\mu} \cdot M_{RB,b,f,c}^{PUSCH}(i)\right) + \\ PL_{b,f,c}(q_d) + \Delta_{F\_PUSCH}(F) + \Delta_{TF,b,f,c}(i) + g_{b,f,c}(i, l) \end{Bmatrix}$$

Where $P_{CMAX,f,c}(i)$ is a maximum transmitting power on a current carrier of the terminal, i is an index of one PUCCH transmission; $q_u$ is an index of a target power $P_{O\_PUCCH,b,f,c}$; $q_d$ is an index of a reference signal used for path loss measurement and is used to obtain a path loss value; $g_{b,f,c}(i,l)$ is a power control adjustment state in which l is an index of the power control adjustment state. The terminal determines a closed-loop power adjustment factor according to a TPC command field from a network side, and the TPC command field may be carried by DCI used for scheduling a PDSCH corresponding to the PUCCH in an UE search space, and also may be carried by a DCI format 2_2 used for carrying a group TPC command filed in a common search space. The power control adjustment states corresponding to different power control adjustment state indexes are calculated independently, so that different PUCCH transmitting powers may be obtained.

In the NR, the terminal determines transmission beams and power control parameters for a scheduled PUCCH based on spatial relation information (PUCCH-SpatialRelation-Info) configured by high-layer signaling. Each piece of spatial relation information includes a set of power control parameters of PUCCH (including the parameters mentioned above). In a case the target power $P_{O\_PUCCH,b,f,c}(q_u)$ corresponding to the target power index $q_u$ included in one piece of spatial relation information is reconfigured, the terminal needs to reset the power control adjustment state corresponding to the power control adjustment state index included in the space relation information (that is, setting an accumulated value to zero), and the power control adjustment states corresponding to other power control adjustment state indexes are not affected. Responsive to that the space relation information does not be configured by high-layer signaling, the terminal will reset the power control adjustment state corresponding to l=0 (i.e., setting the accumulated value to zero) as long as the target power $P_{O\_PUCCH,b,f,c}(q_u)$ is reconfigured.

For retransmissions of the PUSCH and the PUCCH on Frequency Range 2 (FR2), different retransmissions may be transmitted to different TRPs. At this time, the network device (such as, a base station) may configure different transmission beams and power control parameters for different retransmissions through the SRI-PUSCH-PowerControl parameter field or the PUCCH space relation information. For retransmissions of the PUSCH and the PUCCH on FR1, the network device does not need to configure the SRI-PUSCH-PowerControl parameter field and the PUCCH space relation information, but only configures a set of open-loop power control parameters for the PUSCH and the PUCCH through high-layer signaling, respectively, and the set of open-loop power control parameters is used for all retransmissions (whether transmitted to different TRPs or not). Furthermore, all PUSCH and PUCCH retransmissions perform closed-loop power control by using the power control adjustment state corresponding to the power control adjustment state index l=0. In a case the open-loop power control parameters are reconfigured, the terminal will set the power control adjustment state corresponding to l=0 to zero.

In order to perform more accurate uplink power control on the FR1, independent power control parameters can be used for retransmissions transmitted to different TRPs, so that a transmitting power matches with a channel of a corresponding TRP better. At this time, when a certain open-loop power control parameter is reconfigured, how to reset a power control adjustment state while ensuring independent closed-loop power control for two TRPs is a problem that needs to be solved.

On this basis, the embodiments of the disclosure provide a method for uplink power control, in a case the terminal device is configured with multiple sets (such as, two or more sets) of open-loop power control parameters for uplink retransmissions, when one set of parameters are reconfigured, the terminal device only sets a power control adjustment state associated with a specific power control adjustment state index corresponding to the set of parameters to zero. In this way, on the one hand, it can support configuring independent power control parameters for uplink retransmissions to different TRPs. On the other hand, it also can ensure that the reconfiguration of the open-loop power control parameters for a certain retransmission will only affect closed-loop power control for the retransmission, but will not affect closed-loop power control for other retransmissions, so as to enable independent power control for the uplink retransmissions to different TRPs.

Hereinafter, the technical solutions of the present disclosure will be introduced and explained through several embodiments.

Referring to FIG. 7, which illustrates a flowchart of a method for uplink power control according to an embodiment of the present disclosure. The method may be applied to the terminal device of the network architecture illustrated in FIG. 1, and may include the following operations (710-720).

In operation 710, multiple sets of open-loop power control parameters are determined, each set of open-loop power control parameters includes one or more open-loop power control parameters, and the multiple sets of open-loop power control parameters are respectively used for different retransmissions of a same uplink signal.

In one example, the terminal device determines two or more sets of open-loop power control parameters.

In one example, the multiple sets of open-loop power control parameters are respectively used for retransmissions of the uplink signal on different time domain resources, retransmissions of the uplink signal on different frequency domain resources, or retransmissions of the uplink signal on different panels. The time domain resources may be time domain units such as frames, sub-frames, slots, sub-slots, OFDM symbols, and the frequency domain resources may be sub-carriers or other frequency domain units.

In one example, different precoding vectors or beamforming weights are used for the different retransmissions. Thus, retransmissions transmitted to different TRPs may be matched with channel information between corresponding TRPs through different precoding vectors or beamforming weights, thereby obtaining better uplink transmission performance.

In one example, path loss measurement reference signals used for the different retransmissions come from different TRPs, which indicates that different retransmissions are transmitted to different TRPs. In the implementation process, whether the reference signals come from different TRPs is invisible to the terminal device, and the reference signals of different TRPs may be reflected as the reference signals that use different TCI states.

In one example, the uplink signal is a PUSCH or a PUCCH.

In one example, each set of open-loop power control parameters includes at least one of a target power or a path loss factor.

In one example, the multiple sets of open-loop power control parameters are configured by the network device to the terminal device. For example, the network device configures multiple sets of open-loop power control parameters for the terminal device through high-layer signaling.

In operation 720, in a case target open-loop power control parameters are reconfigured, a target power control adjustment state associated with a power control adjustment state index corresponding to the target open-loop power control parameters is set to zero. The target open-loop power control parameters are any set of the multiple sets of open-loop power control parameters.

In one example, in a case the target open-loop power control parameters are reconfigured, the terminal device sets only the target power control adjustment state associated with the power control adjustment state index corresponding to the target open-loop power control parameters to zero. Moreover, power control adjustment states associated with other power control adjustment state indexes are not affected, that is, zero setting is not performed. For example, the network device configures the terminal device with two power control adjustment states, which are correspond to power control adjustment state indexes 0 and 1, respectively. Responsive to that a value of the power control adjustment state index corresponding to the target open-loop power control parameters is 0, only the target power control adjustment state associated with the index 0 is set to zero, and the power control adjustment state associated with the index 1 is not affected, thereby realizing independent closed-loop power control for different TRPs.

In one example, the target open-loop power control parameters and the target power control adjustment state are used for a same retransmission.

In one example, the terminal device determines a power control adjustment state in which a retransmission with the target open-loop power control parameters is performed as the target power control adjustment state. For example, responsive to that the open-loop power control parameters are used for the first and third transmissions of the uplink signal, and the power control adjustment state index used in the first and third transmissions is 0, the terminal device determines the power control adjustment state with the index of 0 as the target power control adjustment state, and sets it to zero in a case the target open-loop power control parameters are reconfigured.

In an exemplary embodiment, in a case the uplink signal is a PUSCH, the target open-loop power control parameters are an i-th set of the multiple sets of open-loop power control parameters configured by high-layer signaling, and i is a positive integer. Accordingly, the power control adjustment state index corresponding to the target open-loop power control parameters is an i-th power control adjustment state index used for a PUSCH retransmission configured by high-layer signaling; or a value of the power control adjustment state index corresponding to the target open-loop power control parameters is i−1.

For example, the multiple sets of open-loop power control parameters include first open-loop power control parameters and second open-loop power control parameters, and the first open-loop power control parameters and the second open-loop power control parameters are two different sets of open-loop power control parameters. In a case the first open-loop power control parameters are reconfigured, the terminal device only sets the power control adjustment state associated with the first power control adjustment state index to zero. The first open-loop power control parameters may be a first target power or path loss factor configured by high-layer signaling, the first power control adjustment state index is a first power control adjustment state index used for the PUSCH retransmission configured by high-layer signaling, or the value of the first power control adjustment state index is 0. In a case the second open-loop power control parameters are reconfigured, the terminal device only sets the power control adjustment state associated with the second power control adjustment state index to zero. The second open-loop power control parameters may be a second target power or path loss factor configured by high-layer signaling, the second power control adjustment state index is a second power control adjustment state index used for the PUSCH retransmission configured by high-layer signaling, or the value of the second power control adjustment state index is 1.

In an exemplary embodiment, in a case the uplink signal is a PUCCH, the target open-loop power control parameters are a target power with a lowest identity (ID) in target powers used for PUCCH configured by high-layer signaling, for example, a target power with ID=0. Accordingly, the power control adjustment state index corresponding to the target open-loop power control parameters is a first power control adjustment state index used for a PUCCH retransmission configured by high-layer signaling; or a value of the power control adjustment state index corresponding to the target open-loop power control parameters is 0.

For example, the multiple sets of open-loop power control parameters include third open-loop power control parameters and fourth open-loop power control parameters, and the third open-loop power control parameters and the fourth open-loop power control parameters are two different sets of open-loop power control parameters. In a case the third open-loop power control parameters are reconfigured, the terminal device only sets the power control adjustment state associated with the third power control adjustment state index to zero. The third open-loop power control parameters may be the target power with the lowest ID in the target powers configured by high-layer signaling, and the third power control adjustment state index is the first power control adjustment state index used for the PUCCH retransmission configured by high-layer signaling, or the value of the third power control adjustment state index is 0.

In an exemplary embodiment, in a case the uplink signal is a PUCCH, the target open-loop power control parameters are a target power with a second lowest ID or a target power with a highest ID in target powers used for PUCCH configured by high-layer signaling. Accordingly, the power control adjustment state index corresponding to the target open-loop power control parameters is a second power control adjustment state index used for a PUCCH retransmission configured by high-layer signaling; or a value of the power control adjustment state index corresponding to the target open-loop power control parameters is 1.

For example, the multiple sets of open-loop power control parameters include third open-loop power control parameters and fourth open-loop power control parameters, and the third open-loop power control parameters and the fourth open-loop power control parameters are two different sets of open-loop power control parameters. In a case the fourth open-loop power control parameters are reconfigured, the terminal device only sets the power control adjustment state associated with the fourth power control adjustment state index to zero. The fourth open-loop power control parameters may be the target power with the second lowest ID or the target power with the highest ID in the target powers configured by high-layer signaling, and the fourth power control adjustment status index is the second power control adjustment status index for the PUCCH retransmission configured by high-layer signaling, or the value of the fourth power control adjustment status index is 1.

In an exemplary embodiment, the target open-loop power control parameters are a set of open-loop power control parameters selected by the terminal device from the multiple sets of open-loop power control parameters and reported to the network device. Accordingly, the power control adjustment state index corresponding to the target open-loop power control parameters is a power control adjustment state index selected by the terminal device from multiple power control adjustment state indexes and reported to the network device, and corresponding to the target open-loop power control parameters.

For example, the multiple sets of open-loop power control parameters include fifth open-loop power control parameters, and the fifth open-loop power control parameters are a set of open-loop power control parameters selected by the terminal device from the multiple sets of open-loop power control parameters and reported to the network device. In a case the fifth open-loop power control parameters are reconfigured, the terminal device only sets the power control adjustment state associated with the fifth power control adjustment state index to zero. The fifth open-loop power control parameters may be a target power or a path loss factor selected by the terminal device from multiple target power or path loss factors configured by high-layer signaling and reported to the network device, and the fifth power control adjustment state index is the power control adjustment state index selected by the terminal device from the multiple of power control adjustment state indexes and reported to the network device, and corresponding to the fifth open-loop power control parameters.

In one example, the above method is performed in a case a network device does not indicate a beam-related configuration to the terminal device. For example, the above beam-related configuration may be SRI-PUSCH-PowerControl for PUSCH or SRI, or space relation information for PUCCH.

It should be noted that the power control adjustment state mentioned in the present disclosure may also be referred to as a closed-loop power control adjustment state. Accordingly, the power control adjustment state index may also be referred to as a closed-loop power control adjustment state index. That is, in a case the target open-loop power control parameters are reconfigured, the closed-loop power control adjustment state associated with the closed-loop power control adjustment state index corresponding to the target open-loop power control parameters is reset (that is, setting to zero), so as to ensure that the reconfiguration of open-loop power control parameters for a certain retransmission will only affect closed-loop power control for the retransmission, but not affect the closed-loop power control for other retransmissions.

To sum up, in the technical solutions according to the embodiments of the disclosure, in a case the terminal device is configured with multiple sets (such as, two or more sets) of open-loop power control parameters for uplink retransmissions, when one set of parameters are reconfigured, the terminal device only sets a power control adjustment state associated with a specific power control adjustment state index corresponding to the set of parameters to zero. In this way, on the one hand, it can support configuring independent power control parameters for uplink retransmissions to different TRPs. On the other hand, it also can ensure that the reconfiguration of the open-loop power control parameters for a certain retransmission will only affect closed-loop power control for the retransmission, but will not affect closed-loop power control for other retransmissions, so as to enable independent power control for the uplink retransmissions to different TRPs.

Referring to FIG. 8, which illustrates a flowchart of a method for uplink power control according to an embodiment of the present disclosure. The method may be applied to the terminal device of the network architecture illustrated in FIG. 1, and may include the following operations (810-820):

In operation 810, multiple sets of open-loop power control parameters are determined, each set of open-loop power control parameters includes one or more open-loop power control parameters, and the multiple sets of open-loop power control parameters are respectively used for different retransmissions of a same PUSCH. Each set of open-loop power control parameters includes at least one of a target power or a path loss factor.

In one example, the multiple sets of open-loop power control parameters are respectively used for retransmissions of the PUSCH on different time domain resources. For example, one set of open-loop power control parameters are used for retransmissions on a portion of slots and another set of open-loop power control parameters are used for retransmissions on other slots; or one set of open-loop power control parameters are used for retransmissions on a portion of OFDM symbols and another set of open-loop power control parameters are used for retransmissions on another portion of OFDM symbols.

In another example, the multiple sets of open-loop power control parameters are respectively used for retransmissions of the PUSCH on different frequency domain resources. For example, one set of open-loop power control parameters are used for retransmissions on a portion of Physical Resource Blocks (PRBs) or sub-bands and another set of open-loop power control parameters are used for retransmissions on another portion of PRBs or sub-bands.

In another example, the multiple sets of open-loop power control parameters are respectively used for retransmissions of the PUSCH on different panels. For example, one set of open-loop power control parameters are used for retransmissions on one panel and another set of open-loop power control parameters are used for retransmissions on another panel.

In one example, different precoding vectors or beamforming weights are used for the different retransmissions. For example, a PUSCH retransmission using a first set of open-loop power control parameters uses different precoding vectors or beamforming weights than a PUSCH retransmission using a second set of open-loop power control parameters. In this way, retransmissions transmitted to different TRPs may be matched with channel information between corresponding TRPs through different precoding vectors or beamforming weights, thereby obtaining better uplink transmission performance.

In one example, path loss measurement reference signals used for the different retransmissions come from different TRPs, which indicates that different retransmissions are transmitted to different TRPs. For example, in a case the path loss measurement reference signals are Channel State Information-Reference Signals (CSI-RSs), the path loss measurement reference signals used for different retransmissions come from different sets of CSI-RSs.

In an exemplary embodiment, the network device pre-configures a set of open-loop power control parameters of the PUSCH through high-layer signaling (e.g. high-layer parameter p0-AlphaSets). For example, the high-layer parameter P0-AlphaSets includes one or more P0-PUSCH-AlphaSets, and each P0-PUSCH-AlphaSet includes a target power configuration (P0) and a path loss factor configuration (alpha), which are used for obtaining the target power $P_{O\_PUSCH,b,f,c}(j)$ and the path loss factor $\alpha_{b,f,c}(j)$, respectively. The above one or more P0-PUSCH-AlphaSets include the above two open-loop power control parameters for determining the transmitting power of different retransmissions of the same PUSCH. Where different P0-PUSCH-AlphaSets may be used for different purposes, such as, some of which used for a dynamic scheduling PUSCH and some of which used for a configured grant PUSCH. Specifically, the above two open-loop power control parameters used for the PUSCH retransmission are respectively a first target power and the second target power configured by high-layer signaling, or a first path loss factor and a second path loss factor configured by high-layer signaling.

For example, for the dynamic scheduling PUSCH, the above two open-loop power control parameters are P0 or alpha included in the first P0-PUSCH-AlphaSet and P0 or alpha included in the second P0-PUSCH-AlphaSet configured in the high-layer parameter P0-AlphaSets, respectively.

For example, for the configured grant PUSCH, the above two open-loop power control parameters are P0 or alpha included in P0-PUSCH-AlphaSets respectively corresponding to two P0-PUSCH-AlphaSetIds included in the ConfiguredGrantConfig.

Based on the configuration manner, independent power control parameters may be configured for the uplink retransmissions to different TRPs, so that the power control for the uplink signal matches with channels between the corresponding received TRPs, and more accurate uplink power control is achieved.

In operation 820, in a case target open-loop power control parameters are reconfigured, a target power control adjustment state associated with a power control adjustment state index corresponding to the target open-loop power control parameters is set to zero. The target open-loop power control parameters are any set of the multiple sets of open-loop power control parameters.

In one example, in a case the target open-loop power control parameters are reconfigured, the terminal device sets only the target power control adjustment state associated with the power control adjustment state index corresponding to the target open-loop power control parameters to zero. Moreover, in the multiple sets of open-loop power control parameters, the power control adjustment states associated with the power control adjustment state indexes corresponding to other open-loop power control parameters except the target open-loop power control parameters are not affected, that is, zero setting is not performed.

In one example, the target open-loop power control parameters and the target power control adjustment state are used for a same retransmission.

In an exemplary embodiment, the multiple sets of open-loop power control parameters include first open-loop power control parameters and second open-loop power control parameters, and the first open-loop power control parameters and the second open-loop power control parameters are two different sets of open-loop power control parameters.

The first open-loop power control parameters are a first target power or path loss factor configured by high-layer signaling, for example, P0 or alpha included in the first P0-PUSCH-AlphaSet configured in the high-layer parameter P0-AlphaSets, or P0 or alpha included in the P0-PUSCH-AlphaSet corresponding to the first P0-PUSCH-AlphaSetId included in the high-layer parameter ConfiguredGrantConfig. The second open-loop power control parameters are a second target power or path loss factor configured by high-layer signaling, for example, P0 or alpha included in the second P0-PUSCH-AlphaSet configured in the high-layer parameter P0-AlphaSets, or P0 or alpha included in the P0-PUSCH-AlphaSet corresponding to the second P0-PUSCH-AlphaSetId included in the high-level parameter ConfiguredGrantConfig.

In an implementation, the network device may configure two power control adjustment state indexes (i.e. values of two 1) for PUSCH retransmissions through high-layer signaling in advance, where different indexes are used for different PUSCH retransmissions. For example, a first index is used for an odd number of PUSCH retransmissions, and a second index is used for an even number of PUSCH retransmissions. As illustrated in FIG. 9, in a case the first open-loop power control parameters (the first target power P0, 0 or the path loss factor alpha0 configured by high-layer signaling) are reconfigured, the terminal device sets a power control adjustment state associated with the first index (the first 1 and assuming as 10) of the two power control adjustment state indexes to zero, and other power control adjustment states are not affected. In a case the second open-loop power control parameters (the second target power P0, 1 or the path loss factor alpha1 configured by high-layer signaling) are reconfigured, the terminal device sets a power control adjustment state associated with the second index (the second 1 and assuming as 11) of the two power control adjustment state indexes to zero, and the other power control adjustment states are not affected.

In another implementation, in a case the first open-loop power control parameters (the first target power P0, 0 or the path loss factor alpha0 configured by high-layer signaling) are reconfigured, the terminal device sets the power control adjustment state associated with the power control adjustment state index of 0 to zero, and other power control adjustment states are not affected. In a case the second open-loop power control parameters (the second target power P0, 1 or the path loss factor alpha1 configured by high-layer signaling) are reconfigured, the terminal device sets the power control adjustment state associated with the power control adjustment state index of 1 to zero, and other power control adjustment states are not affected.

In an exemplary embodiment, the terminal device selects two target powers or path loss factors as two open-loop power control parameters from the multiple target powers or path loss factors (i.e. the multiple P0-PUSCH-AlphaSets) configured by high-layer signaling (p0-AlphaSets) and reports to the network device. The terminal device simultaneously reports the power control adjustment state indexes respectively corresponding to the two open-loop power control parameters. In a case one of the target powers or road loss factors is reconfigured, the terminal device only sets the reported power control adjustment state associated with the power control adjustment state index corresponding to the target power or road loss factor to zero, and other power control adjustment states are not affected.

In one example, the method according to the present embodiment is performed in a case the terminal device is configured with closed-loop power control in an accumulation mode. In addition, the method according to the present embodiment is also performed in a case the network device does not configure the SRI or the PUCCH power control parameter associated with the SRI (SRI-PUSCH-PowerControl) to the terminal device. Further, the method according to the present embodiment may be used only for FR1.

Further, the terminal device may determine the transmitting power of the PUSCH according to a power control adjustment state after being set to zero. For example, the terminal device determines an updated power control adjustment state based on the power control adjustment state that is set to zero and a last received TPC command, thereby determining the transmitting power of the PUSCH.

Based on the method according to the present embodiment, it is ensured that the reconfiguration of the open-loop power control parameters for a certain PUSCH retransmission will only affect closed-loop power control for the retransmission, but will not affect closed-loop power control for other retransmissions, thus realizing independent power control for PUSCH retransmissions of different TRPs.

Referring to FIG. 10, which illustrates a flowchart of a method for uplink power control according to another embodiment of the present disclosure. The method may be applied to the terminal device of the network architecture illustrated in FIG. 1, and may include the following operations (1010-1020):

In operation 1010, multiple sets of open-loop power control parameters are determined, each set of open-loop power control parameters includes one or more open-loop power control parameters, and the multiple sets of open-loop power control parameters are respectively used for different retransmissions of a same PUCCH. Each set of open-loop power control parameters includes a target power.

In one example, the multiple sets of open-loop power control parameters are respectively used for retransmissions of the PUCCH on different time domain resources. For example, one set of open-loop power control parameters are used for retransmissions on a portion of slots and another set of open-loop power control parameters are used for retransmissions on other slots.

In another example, the multiple sets of open-loop power control parameters are respectively used for retransmissions of the PUCCH on different Panels. For example, one set of open-loop power control parameters are used for retransmissions on one Panel and another set of open-loop power control parameters are used for retransmissions on another Panel.

In one example, path loss measurement reference signals used for the different retransmissions come from different TRPs, which indicates that different retransmissions are transmitted to different TRPs. For example, in a case the path loss measurement reference signals are Synchronization Signal and PBCH Blocks (SSBs), the path loss measurement reference signals used for different retransmissions are SSBs with different SSB indexes.

In an exemplary embodiment, the network device pre-configures a set of target powers of the PUCCH through high-layer signaling (e.g. high-layer parameter p0-Set). For example, the high-layer parameter P0-Set includes one or more P0-PUCCHs, and each P0-PUCCH includes a target power configuration (P0), which is used to obtain the target power of the PUCCH $P_{O\_PUCCH,b,f,c}(q_u)$ The above one or more P0-PUCCHs include two target powers for determining the transmitting power of different retransmissions of the same PUCCH. Specifically, the two target powers are respectively a target power with a lowest ID and a target power with a second lower ID in the multiple target powers configured by high-layer signaling, or a target power with a lowest ID and a target power with a highest ID. For example, the two target powers are respectively P0 included in P0-PUCCH corresponding to a smallest P0-PUCCH-Id and P0 included in P0-PUCCH corresponding to a second smallest P0-PUCCH-Id configured in the high-layer parameter P0-Set; or P0 included in P0-PUCCH corresponding to a smallest P0-PUCCH-Id and P0 included in P0-PUCCH corresponding to a largest P0-PUCCH-Id configured in the high-layer parameter P0-Set.

In operation 1020, in a case target open-loop power control parameters are reconfigured, a target power control adjustment state associated with a power control adjustment state index corresponding to the target open-loop power control parameters is set to zero. The target open-loop power control parameters are any set of the multiple sets of open-loop power control parameters.

In one example, in a case the target open-loop power control parameters are reconfigured, the terminal device sets only the target power control adjustment state associated with the power control adjustment state index corresponding to the target open-loop power control parameters to zero. Moreover, in the multiple sets of open-loop power control parameters, the power control adjustment states associated with the power control adjustment state indexes corresponding to other open-loop power control parameters except the target open-loop power control parameters are not affected, that is, zero setting is not performed.

In one example, the target open-loop power control parameters and the target power control adjustment state are used for a same retransmission.

In an exemplary embodiment, the terminal device receives multiple target powers configured by the network device, the multiple target powers includes a first target power and a second target power. The first target power is the target power with the lowest ID in the multiple target powers configured by high-layer signaling, for example, P0 included in P0-PUCCH corresponding to the smallest P0-PUCCH-Id configured in the high-layer parameter P0-Set. The second target power is the target power with the second lowest ID or the highest ID in the multiple target powers configured by high-layer signaling, for example, P0 included in P0-PUCCH corresponding to the second smallest P0-PUCCH-Id or P0 included in P0-PUCCH corresponding to the largest P0-PUCCH-Id configured in the high-layer parameter P0-Set.

Figure 11:
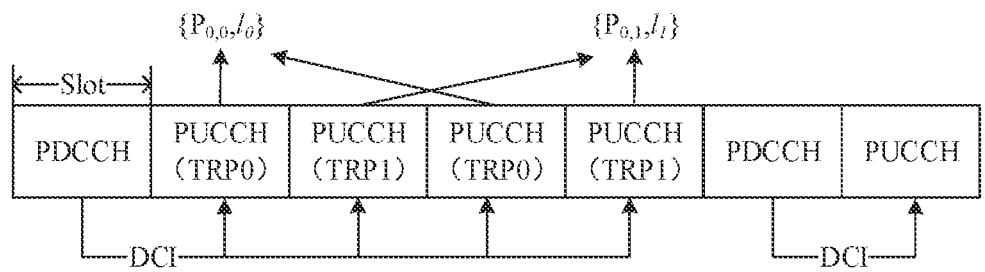
FIG. 11 illustrates a schematic diagram of power control for a PUCCH retransmission based on multiple TRPs.

In an exemplary embodiment, the network device may configure two power control adjustment state indexes (i.e., values of two 1) for PUCCH retransmissions through high-layer signaling in advance, where different indexes are used for different PUCCH retransmissions. For example, a first index is used for an odd number of PUCCH retransmissions, and a second index is used for an even number of PUCCH retransmissions. As illustrated in FIG. 11, in a case the first target power (the target power P0, 0 with the lowest ID in the multiple target powers configured by high-layer signaling) is reconfigured, the terminal device sets a power control adjustment state associated with the first index (the first 1 and assuming as 10) of the two power control adjustment state indexes to zero, and the other power control adjustment states are not affected. In a case the second target power (the target power P0, 1 with the second lowest ID or the highest ID in the multiple target powers configured by high-layer signaling) is reconfigured, the terminal device sets a power control adjustment state associated with the second index (the second 1 and assuming as 11) of the two power control adjustment state indexes to zero, and the other power control adjustment states are not affected.

In an exemplary embodiment, in a case the first target power (the target power P0, 0 with the lowest ID in the multiple target powers configured by high-layer signaling) is reconfigured, the terminal device sets the power control adjustment state associated with the power control adjustment state index of 0 to zero, and other power control adjustment states are not affected. In a case the second target power (the target power P0, 1 with the second lowest ID or the highest ID in the multiple target powers configured by high-layer signaling) is reconfigured, the terminal device sets the power control adjustment state associated with the power control adjustment state index of 1 to zero, and other power control adjustment states are not affected.

In one example, the method according to the present embodiment is performed in a case the network device does not configure the terminal device with PUCCH-SpatialRelationInfo.

Further, the terminal device may determine the transmitting power of the PUCCH according to a power control adjustment state after being set to zero. For example, the terminal device determines an updated power control adjustment state based on the power control adjustment state that set to zero and a last received TPC command, thereby determining the transmitting power of the PUCCH.

Based on the method according to the present embodiment, it is ensured that the reconfiguration of the open-loop power control parameters for a certain PUCCH retransmission will only affect closed-loop power control for the retransmission, but will not affect closed-loop power control for other retransmissions, thus realizing independent power control for PUCCH retransmissions of different TRPs.

The following are embodiments of the device of the present disclosure, which can be used to perform the embodiments of the method of the present disclosure. For details not disclosed in the apparatus embodiments of the present disclosure may refer to the method embodiments of the present disclosure.

Figure 12:
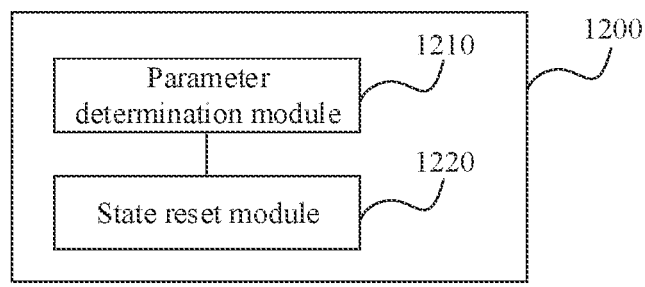
FIG. 12 is a block diagram of a device for uplink power control according to an embodiment of the present disclosure.

Referring to FIG. 12, which illustrates a block diagram of a device for uplink power control according to an embodiment of the present disclosure. The device has functions of realizing the method example of the terminal device side mentioned above, which may be realized by hardware or by executing corresponding software through hardware. The device may be the terminal device mentioned above or may be provided in the terminal device. As illustrated in FIG. 12, the device 1200 may include a parameter determination module 1210 and a state reset module 1220.

The parameter determination module 1210 is configured to determine multiple sets of open-loop power control parameters, each set of open-loop power control parameters includes one or more open-loop power control parameters, and the multiple sets of open-loop power control parameters are respectively used for different retransmissions of a same uplink signal.

The state reset module 1220 is configured to set a target power control adjustment state associated with a power control adjustment state index corresponding to target open-loop power control parameters to zero in a case the target open-loop power control parameters are reconfigured. The target open-loop power control parameters are any set of the multiple sets of open-loop power control parameters In an exemplary embodiment, the target open-loop power control parameters and the target power control adjustment state are used for a same retransmission.

In an exemplary embodiment, the terminal device determines a power control adjustment state in which a retransmission with the target open-loop power control parameters is performed as the target power control adjustment state.

In an exemplary embodiment, the multiple sets of open-loop power control parameters are respectively used for retransmissions of the uplink signal on different time domain resources, retransmissions of the uplink signal on different frequency domain resources, or retransmissions of the uplink signal on different panels.

In an exemplary embodiment, different precoding vectors or beamforming weights are used for the different retransmissions.

In an exemplary embodiment, path loss measurement reference signals used for the different retransmissions come from different TRPs.

In an exemplary embodiment, the uplink signal is a PUSCH or a PUCCH.

In an exemplary embodiment, each set of open-loop power control parameters includes at least one of a target power or a path loss factor.

In an exemplary embodiment, in a case the uplink signal is a PUSCH, the target open-loop power control parameters are an i-th set of the multiple sets of open-loop power control parameters configured by high-layer signaling, and i is a positive integer. Accordingly, the power control adjustment state index corresponding to the target open-loop power control parameters is an i-th power control adjustment state index used for a PUSCH retransmission configured by high-layer signaling; or a value of the power control adjustment state index corresponding to the target open-loop power control parameters is i−1.

In an exemplary embodiment, in a case the uplink signal is a PUCCH, the target open-loop power control parameters are a target power with a lowest ID in target powers used for PUCCH configured by high-layer signaling. Accordingly, the power control adjustment state index corresponding to the target open-loop power control parameters is a first power control adjustment state index used for a PUCCH retransmission configured by high-layer signaling; or a value of the power control adjustment state index corresponding to the target open-loop power control parameters is 0.

In an exemplary embodiment, in a case the uplink signal is a PUCCH, the target open-loop power control parameters are a target power with a second lowest ID or a target power with a highest ID in target powers used for PUCCH configured by high-layer signaling. Accordingly, the power control adjustment state index corresponding to the target open-loop power control parameters is a second power control adjustment state index used for a PUCCH retransmission configured by high-layer signaling; or a value of the power control adjustment state index corresponding to the target open-loop power control parameters is 1.

In an exemplary embodiment, the target open-loop power control parameters are a set of open-loop power control parameters selected by the terminal device from the multiple sets of open-loop power control parameters and reported to a network device. Accordingly, the power control adjustment state index corresponding to the target open-loop power control parameters is a power control adjustment state index selected by the terminal device from multiple power control adjustment state indexes and reported to the network device, and corresponding to the target open-loop power control parameters.

In an exemplary embodiment, the method is performed in a case a network device does not indicate a beam-related configuration to the terminal device.

To sum up, in the technical solutions according to the embodiments of the disclosure, in a case the terminal device is configured with multiple sets (such as, two or more sets) of open-loop power control parameters for uplink retransmissions, when one set of parameters are reconfigured, the terminal device only sets a power control adjustment state associated with a specific power control adjustment state index corresponding to the set of parameters to zero. In this way, on the one hand, it can support configuring independent power control parameters for uplink retransmissions to different TRPs. On the other hand, it also can ensure that the reconfiguration of the open-loop power control parameters for a certain retransmission will only affect closed-loop power control for the retransmission, but will not affect closed-loop power control for other retransmissions, so as to enable independent power control for the uplink retransmissions to different TRPs.

It should be noted that when implementing its functions of the device according to the above embodiments, it is only illustrated by the divisions of the above functional modules. In practical applications, the above functions can be allocated to complete by different functional modules according to actual needs, that is, the content structure of the device is divided into different functional modules to complete all or part of the functions mentioned above.

With regard to the device in the above embodiments, the specific manners in which each module performs operations have been described in detail in the embodiments of the method, and will not be described in detail herein.

Figure 13:
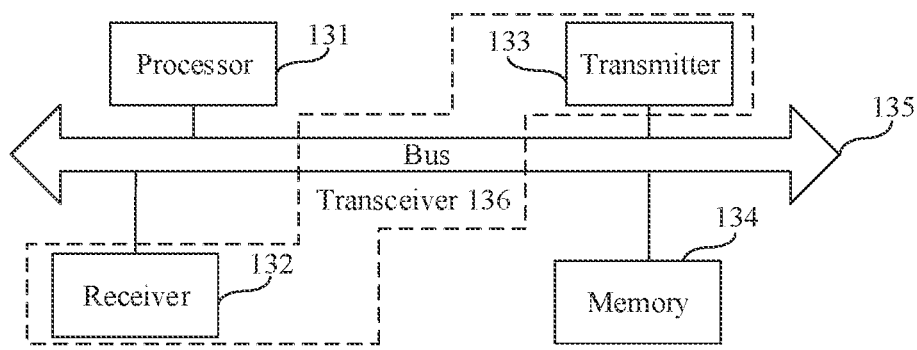
FIG. 13 is a schematic structural diagram of a terminal device according to an embodiment of the present disclosure.

Referring to FIG. 13, which illustrates schematic structural diagram of a terminal device 130 according to an embodiment of the present disclosure. The terminal device 130 may include a processor 131, a receiver 132, a transmitter 133, a memory 134 and a bus 135.

The processor 131 includes one or more processing cores, and the processor 131 preforms various functional applications and information processing by running software programs and modules.

The receiver 132 and the transmitter 133 may be implemented as a transceiver 136, and the transceiver 136 may be a communication chip.

The memory 134 is connected to the processor 131 through the bus 135.

The memory 134 may be used to store a computer program, and the processor 131 is used to execute the computer program to implement the various operations performed by the terminal device in the above method embodiments.

In addition, the memory 134 may be implemented by any type of volatile or non-volatile storage devices or a combination thereof. The volatile or non-volatile storage devices include, but are not limited to: Random Access Memory (RAM), Read-Only Memory (ROM), Erasable Programmable Read-Only Memory (EPROM), Electrically Erasable Programmable Read-Only Memory (EEPROM), flash memory or other solid-state storage technologies, Compact Disc Read-Only Memory (CD-ROM), Digital Video Disc (DVD) or other optical storages, magnetic tape cassette, magnetic tape, magnetic disk storage or other magnetic storage devices.

In an exemplary embodiment, the processor 131 is configured to determine multiple sets of open-loop power control parameters, each set of open-loop power control parameters includes one or more open-loop power control parameters, and the multiple sets of open-loop power control parameters are respectively used for different retransmissions of a same uplink signal.

The processor 131 is also configured to set a target power control adjustment state associated with a power control adjustment state index corresponding to target open-loop power control parameters to zero in a case the target open-loop power control parameters are reconfigured The target open-loop power control parameters are any set of the multiple sets of open-loop power control parameters.

In an exemplary embodiment, the target open-loop power control parameters and the target power control adjustment state are used for a same retransmission.

In an exemplary embodiment, the terminal device determines a power control adjustment state in which a retransmission with the target open-loop power control parameters is performed as the target power control adjustment state.

In an exemplary embodiment, the multiple sets of open-loop power control parameters are respectively used for retransmissions of the uplink signal on different time domain resources, retransmissions of the uplink signal on different frequency domain resources, or retransmissions of the uplink signal on different panels.

In an exemplary embodiment, different precoding vectors or beamforming weights are used for the different retransmissions.

In an exemplary embodiment, path loss measurement reference signals used for the different retransmissions come from different TRPs.

In an exemplary embodiment, the uplink signal is a PUSCH or a PUCCH.

In an exemplary embodiment, each set of open-loop power control parameters includes at least one of a target power or a path loss factor.

In an exemplary embodiment, in a case the uplink signal is a PUSCH, the target open-loop power control parameters are an i-th set of the multiple sets of open-loop power control parameters configured by high-layer signaling, and i is a positive integer. Accordingly, the power control adjustment state index corresponding to the target open-loop power control parameters is an i-th power control adjustment state index used for a PUSCH retransmission configured by high-layer signaling; or a value of the power control adjustment state index corresponding to the target open-loop power control parameters is i−1.

In an exemplary embodiment, in a case the uplink signal is a PUCCH, the target open-loop power control parameters are a target power with a lowest ID in target powers used for PUCCH configured by high-layer signaling. Accordingly, the power control adjustment state index corresponding to the target open-loop power control parameters is a first power control adjustment state index used for a PUCCH retransmission configured by high-layer signaling; or a value of the power control adjustment state index corresponding to the target open-loop power control parameters is 0.

In an exemplary embodiment, in a case the uplink signal is a PUCCH, the target open-loop power control parameters are a target power with a second lowest ID or a target power with a highest ID in target powers used for PUCCH configured by high-layer signaling. Accordingly, the power control adjustment state index corresponding to the target open-loop power control parameters is a second power control adjustment state index used for a PUCCH retransmission configured by high-layer signaling; or a value of the power control adjustment state index corresponding to the target open-loop power control parameters is 1.

In an exemplary embodiment, the target open-loop power control parameters are a set of open-loop power control parameters selected by the terminal device from the multiple sets of open-loop power control parameters and reported to a network device. Accordingly, the power control adjustment state index corresponding to the target open-loop power control parameters is a power control adjustment state index selected by the terminal device from multiple power control adjustment state indexes and reported to the network device, and corresponding to the target open-loop power control parameters.

In an exemplary embodiment, the method is performed in a case a network device does not indicate a beam-related configuration to the terminal device.

The embodiments of the disclosure also provide a computer-readable storage medium. The storage medium has stored thereon a computer program that, when executed by a processor of a terminal device, implements the method for uplink power control mentioned above.

The embodiments of the disclosure also provide a chip. The chip includes programmable logic circuits and/or program instructions. When running on a terminal device, the chip is used to implement the method for uplink power control mentioned above.

The embodiments of the present disclosure also provide a computer program product. When running on a processor of the terminal device, the computer program product causes a terminal device to perform the method for uplink power control mentioned above.

Those skilled in the art will appreciate that, in one or more of the above examples, the functions described in the embodiments of the present disclosure may be implemented in hardware, software, firmware or any combination thereof. When implemented in software, these functions may be stored in a computer-readable medium or transmitted as one or more instructions or codes on the computer-readable medium. The computer-readable medium includes a computer storage medium and a communication medium, where the communication medium includes any medium that facilitates the transmission of a computer program from one place to another. The storage medium may be any available medium accessible to a general or dedicated computer.

The above are only exemplary embodiments of the present disclosure and is not intended to limit the present disclosure. Any modification, equivalent replacement, improvement and so on made within the spirit and principles of the present disclosure shall be included in the scope of protection of the present disclosure.

The invention claimed is:

1. A method for uplink power control, applied to a terminal device, the method comprising:
   determining a plurality of sets of open-loop power control parameters, each set of open-loop power control parameters comprising one or more open-loop power control parameters, and the plurality of sets of open-loop power control parameters being respectively used for different retransmissions of a same uplink signal; and
   in a case target open-loop power control parameters are reconfigured, setting a target power control adjustment state associated with a power control adjustment state index corresponding to the target open-loop power control parameters to zero,
   wherein the target open-loop power control parameters are any set of the plurality of sets of open-loop power control parameters.

2. The method of claim 1, wherein the target open-loop power control parameters and the target power control adjustment state are used for a same retransmission.

3. The method of claim 1, wherein the plurality of sets of open-loop power control parameters are respectively used for retransmissions of the uplink signal on different time domain resources, retransmissions of the uplink signal on different frequency domain resources, or retransmissions of the uplink signal on different panels.

4. The method of claim 1, wherein the uplink signal is a Physical Uplink Shared Channel (PUSCH) or a Physical Uplink Control Channel (PUCCH).

5. The method of claim 1, wherein each set of open-loop power control parameters comprises at least one of a target power or a path loss factor.

6. The method of claim 1, wherein in a case the uplink signal is a PUSCH, the target open-loop power control parameters are an i-th set of the plurality of sets of open-loop power control parameters configured by high-layer signaling, i being a positive integer;
   the power control adjustment state index corresponding to the target open-loop power control parameters is an i-th power control adjustment state index used for a PUSCH retransmission configured by high-layer signaling; or
   a value of the power control adjustment state index corresponding to the target open-loop power control parameters is i−1.

7. The method of claim 1, wherein the power control adjustment state index corresponding to the target open-loop power control parameters is one of two power control adjustment state indexes configured by a network device through high-layer signaling in advance, and different power control adjustment state indexes are used for different retransmissions of the uplink signal.

8. The method of claim 7, wherein a first one of the two power control adjustment state indexes is used for an odd number of retransmissions of the uplink signal, and a second one of the two power control adjustment state indexes is used for an even number of retransmissions of the uplink signal.

9. A device for uplink power control, comprising:
   a processor,
   a transceiver, and
   a memory configured to store a computer program executable by the processor,
   wherein the processor is configured to perform operations of:
   determining a plurality of sets of open-loop power control parameters, each set of open-loop power control parameters comprising one or more open-loop power control parameters, and the plurality of sets of open-loop power control parameters being respectively used for different retransmissions of a same uplink signal; and
   in a case target open-loop power control parameters are reconfigured, setting a target power control adjustment state associated with a power control adjustment state index corresponding to the target open-loop power control parameters to zero,
   wherein the target open-loop power control parameters are any set of the plurality of sets of open-loop power control parameters.

10. The device of claim 9, wherein the target open-loop power control parameters and the target power control adjustment state are used for a same retransmission.

11. The device of claim 9, wherein the plurality of sets of open-loop power control parameters are respectively used for retransmissions of the uplink signal on different time domain resources, retransmissions of the uplink signal on different frequency domain resources, or retransmissions of the uplink signal on different panels.

12. The device of claim 9, wherein the uplink signal is a Physical Uplink Shared Channel (PUSCH) or a Physical Uplink Control Channel (PUCCH).

13. The device of claim 9, wherein each set of open-loop power control parameters comprises at least one of a target power or a path loss factor.

14. The device of claim 9, wherein in a case the uplink signal is a PUSCH, the target open-loop power control parameters are an i-th set of the plurality of sets of open-loop power control parameters configured by high-layer signaling, i being a positive integer;
   the power control adjustment state index corresponding to the target open-loop power control parameters is an i-th power control adjustment state index used for a PUSCH retransmission configured by high-layer signaling; or
   a value of the power control adjustment state index corresponding to the target open-loop power control parameters is i−1.

15. The device of claim 9, wherein the power control adjustment state index corresponding to the target open-loop power control parameters is one of two power control adjustment state indexes configured by a network device through high-layer signaling in advance, and different power control adjustment state indexes are used for different retransmissions of the uplink signal.

16. The device of claim 15, wherein a first one of the two power control adjustment state indexes is used for an odd number of retransmissions of the uplink signal, and a second one of the two power control adjustment state indexes is used for an even number of retransmissions of the uplink signal.

17. A non-transitory computer-readable storage medium having stored thereon a computer program that, when executed by a processor of a terminal device, causes the processor to perform operations of:
   determining a plurality of sets of open-loop power control parameters, each set of open-loop power control parameters comprising one or more open-loop power control parameters, and the plurality of sets of open-loop power control parameters being respectively used for different retransmissions of a same uplink signal; and
   in a case target open-loop power control parameters are reconfigured, setting a target power control adjustment state associated with a power control adjustment state index corresponding to the target open-loop power control parameters to zero,
   wherein the target open-loop power control parameters are any set of the plurality of sets of open-loop power control parameters.

18. The non-transitory computer-readable storage medium of claim 17, wherein the target open-loop power control parameters and the target power control adjustment state are used for a same retransmission.

19. The non-transitory computer-readable storage medium of claim 17, wherein the plurality of sets of open-loop power control parameters are respectively used for retransmissions of the uplink signal on different time domain resources, retransmissions of the uplink signal on different frequency domain resources, or retransmissions of the uplink signal on different panels.

20. The non-transitory computer-readable storage medium of claim 17, wherein the uplink signal is a Physical Uplink Shared Channel (PUSCH) or a Physical Uplink Control Channel (PUCCH).

* * * * *